United States Patent
diGirolamo et al.

(10) Patent No.: US 6,612,087 B2
(45) Date of Patent: Sep. 2, 2003

(54) BUILDING MEMBER CONNECTOR ALLOWING BI-DIRECTIONAL RELATIVE MOVEMENT

(75) Inventors: Edward R. diGirolamo, Raleigh, NC (US); Richard Mountcastle, Raleigh, NC (US)

(73) Assignee: The Steel Network, Inc., Raleigh, NC (US)

( * ) Notice: Subject to any disclaimer, the term of this patent is extended or adjusted under 35 U.S.C. 154(b) by 0 days.

(21) Appl. No.: 09/726,085

(22) Filed: Nov. 29, 2000

(65) Prior Publication Data

US 2002/0062617 A1 May 30, 2002

(51) Int. Cl.[7] .............................. E04B 1/38; E04C 5/00
(52) U.S. Cl. ...................... 52/712; 52/656.9; 52/167.1; 52/713; 52/243.1; 403/403
(58) Field of Search .............................. 52/243.1, 656.1, 52/656.9, 235, 238.1, 239, 712, 167.1, 713; 403/403, 14, 231; 16/DIG. 43

(56) References Cited

U.S. PATENT DOCUMENTS

| | | | | |
|---|---|---|---|---|
| 1,400,007 A | * | 12/1921 | Sparks | 248/300 |
| 1,691,784 A | * | 11/1928 | Pietzsch | 428/300 |
| 1,729,935 A | * | 10/1929 | Froehlich | 428/300 |
| 2,365,478 A | * | 12/1944 | Grotta | 428/300 |
| 3,003,600 A | * | 10/1961 | McKenzie | 189/34 |
| 3,715,850 A | * | 2/1973 | Chambers | 52/701 |
| 4,251,969 A | * | 2/1981 | Bains | 52/584.1 |
| 4,261,593 A | * | 4/1981 | Yeager | 280/415.1 |
| 4,363,459 A | * | 12/1982 | Holzer | 248/265 |
| 4,796,403 A | * | 1/1989 | Fulton et al. | 52/713 |
| 4,949,929 A | * | 8/1990 | Kesselman et al. | 248/300 |
| 4,973,102 A | * | 11/1990 | Bien | 296/187 |
| 5,009,557 A | * | 4/1991 | Dessirier | 411/504 |
| 5,027,494 A | * | 7/1991 | Martin | 29/402.15 |
| 5,529,273 A | * | 6/1996 | Benthin | 284/254 |
| 5,664,392 A | * | 9/1997 | Mucha | 52/715 |
| 5,671,580 A | * | 9/1997 | Chou | 52/656.4 |
| 5,720,571 A | * | 2/1998 | Frobosilo et al. | 403/403 |
| 5,846,018 A | * | 12/1998 | Frobosilo et al. | 403/403 |
| 5,906,080 A | * | 5/1999 | diGirolamo et al. | 52/243.1 |
| 6,058,668 A | * | 5/2000 | Herren | 52/241 |
| 6,199,929 B1 | * | 3/2001 | Hansch | 296/36 |
| 6,213,679 B1 | * | 4/2001 | Frobosilo et al. | 403/403 |

\* cited by examiner

*Primary Examiner*—Carl D. Friedman
*Assistant Examiner*—Chi Q. Nguyen
(74) *Attorney, Agent, or Firm*—Coats & Bennett, P.L.L.C.

(57) ABSTRACT

The connector of the present invention comprises a planar sheet bent to form two perpendicular plates each of which is formed with one or more elongate slots. The slots on one plate are oriented so as to permit relative deflection of a building member in a vertical direction and the slots on the other plate are oriented so as to permit relative deflection of a building member in a horizontal direction. Each plate is mounted to a respective building member with fasteners passed through a slideable retainer, e.g., either a stepped washer or a guide to mount flush to the building member and slidingly retain the connector.

13 Claims, 6 Drawing Sheets

BUILDING MEMBER CONNECTOR ALLOWING BI-DIRECTIONAL RELATIVE MOVEMENT

FIELD OF THE INVENTION

This invention relates to steel stud building systems and, more particularly to apparatus for connecting vertical and horizontal structural members thereof in a manner to permit relative movement therebetween in a vertical and a horizontal direction.

BACKGROUND OF THE INVENTION

Seismic activity plagues buildings and their inhabitants in many areas of the world, causing untold amounts of damage and monetary loss in addition to injury and loss of life. Building damage is mainly due to the vibration of a building to cause shifts of one portion of the building frame with respect to another portion. In conventional construction, the building components are rigidly locked together and their connective joint will fracture under the vibrational stress, often resulting in collapse.

U.S. Pat. No. 5,467,566 for a Curtain Wall Clip; U.S. Pat. No. 5,876,006 for a Stud Mounting Clip; and U.S. Pat. No. 5,906,080 for a Bracket For Interconnecting A Building Stud To Primary Structural Components each provide connective building components which permit relative movement between structural members in a vertical direction. The teachings of each of these patents are incorporated by reference. These patents all recognize an important need to permit building frame members to shift rather than fracture. However, none of these patents provides for movement in a horizontal plane, although this movement does occur during an earthquake. Thus, while the building floor is free to move relative to its walls for a limited vertical distance when the known connectors are used, horizontal movement is not an option. When the seismic vibration occurs in a direction to induce horizontal shift, damage, injury, and death can still happen.

Therefore, it is an object of the present invention to provide a building component connector that enables relative movement horizontally.

It is an additional object of the present invention to provide a building component connector that enables relative movement both vertically and horizontally.

These and other objects of the present invention will become apparent through the disclosure of the invention to follow.

SUMMARY OF THE INVENTION

The present invention provides a connector for use between building structural members for allowing a degree of freedom of movement in both vertical and horizontal planes. The connector is formed as an angular bracket having parallel, elongate slots in each of its planar portions with the slots in one portion perpendicular to the slots in the other portion. The connector is installed with its first planar portion attached slidingly to a first building component and its second planar portion attached slidingly to a second building component. The relative perpendicular orientation of the sets of slots allows both vertical and horizontal relative movements between the building components.

BRIEF DESCRIPTION OF THE DRAWINGS

In order for the invention to become more clearly understood it will be disclosed in greater detail with reference to the accompanying drawings, in which.

DESCRIPTION OF THE PREFERRED EMBODIMENT

Figure 1:
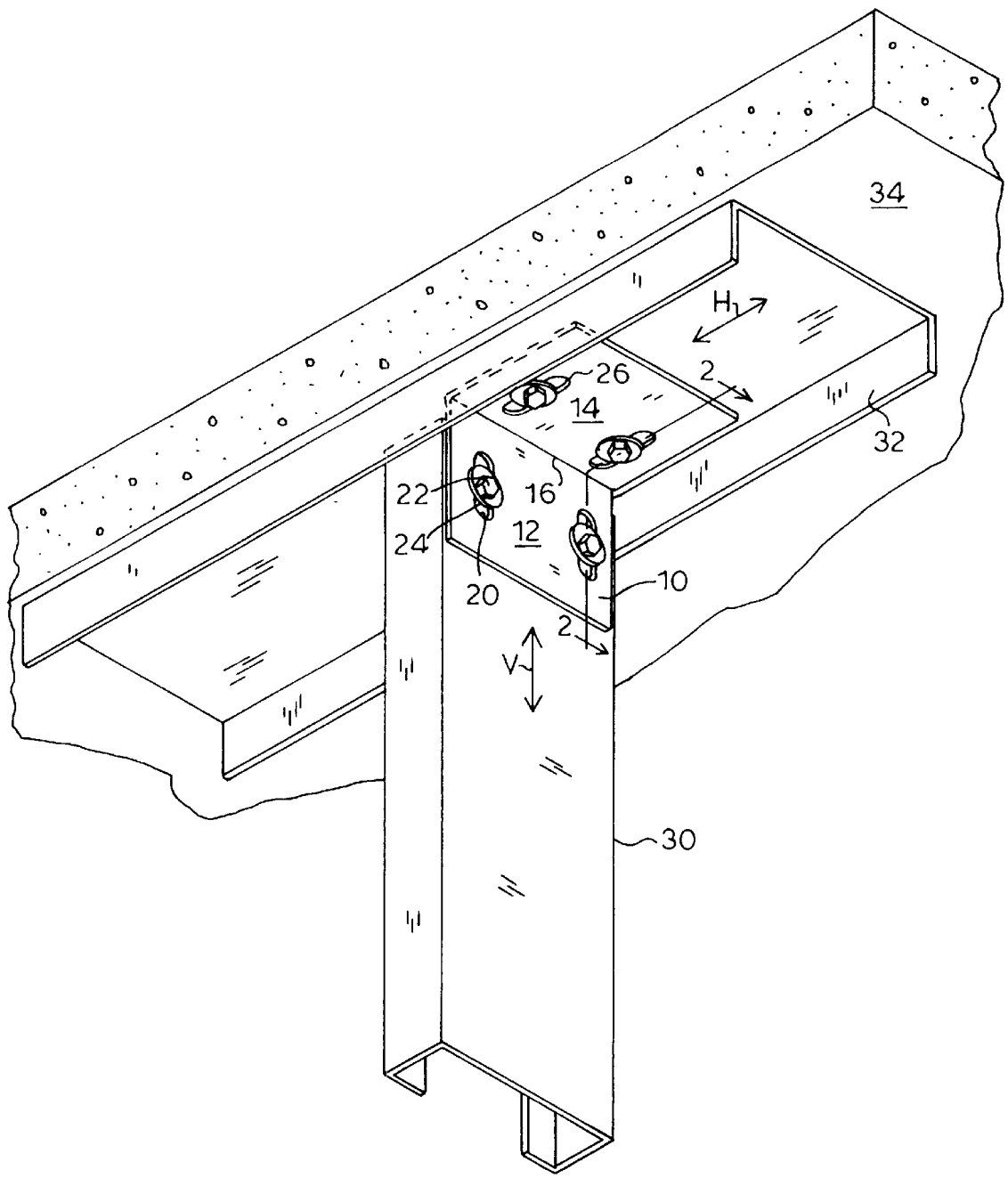
FIG. 1 is a perspective view of a first embodiment of the invention connector installed to connect between a vertical wall stud and a horizontal wall-top track so as to allow bi-directional deflection between the structural components illustrated.

FIG. 1 shows a first embodiment of the invention connector 10 as it is mounted to slidingly connect vertical member 30 to intersecting horizontal member 32. Vertical member 30 is, for example, a metallic wall stud, and horizontal member 32 is, for example, a metallic ceiling track. Connector 10 is formed from a planar metallic sheet that has been bent to form vertical plate 12 and horizontal plate 14 being connected to each other in substantially perpendicular relation at juncture 16. Connector 10 is preferably formed of galvanized sheet steel by punching and bending operations, as are known.

Vertical plate 12 is formed with a pair of vertical slots 20. Horizontal plate 14 is formed with a pair of parallel horizontal slots 26. Variations, such as forming one or both of vertical plate 12 and horizontal plate 14 with stiffening ribs or flanges, or punching a differing number of slots in each plate, are possible within the scope of the present invention.

Each of vertical plate 12 and horizontal plate 14 is slidingly connected to respective vertical member 30 and horizontal member 32 by means of fasteners 22 and stepped washers 24. Stepped washers 24, as described in prior patents '080 and '566 noted above, are positioned into respective slots 20 and 26 and fasteners 22 are installed therethrough. Stepped washers 24 are sized to allow relative sliding motion between vertical member 30 and horizontal member 32 both in vertical direction V and in horizontal direction H. As illustrated, fasteners 22 are preferably installed near the midpoints of slots 20 and 26 to allow for sliding vertical freedom toward each end of the respective slots.

A horizontally disposed member 34 is mounted on a series of supports, of which horizontal track member 32 is an example. If the building structure illustrated is to have additional floors, member 34 is considered a floor member. Alternatively, member 34 represents a roof member.

As will be understood by those skilled in the trade, each plate could be formed with only a single slot, providing the slot were sufficiently long to permit at least two fasteners so as to maintain linear sliding motion.

Figure 2:
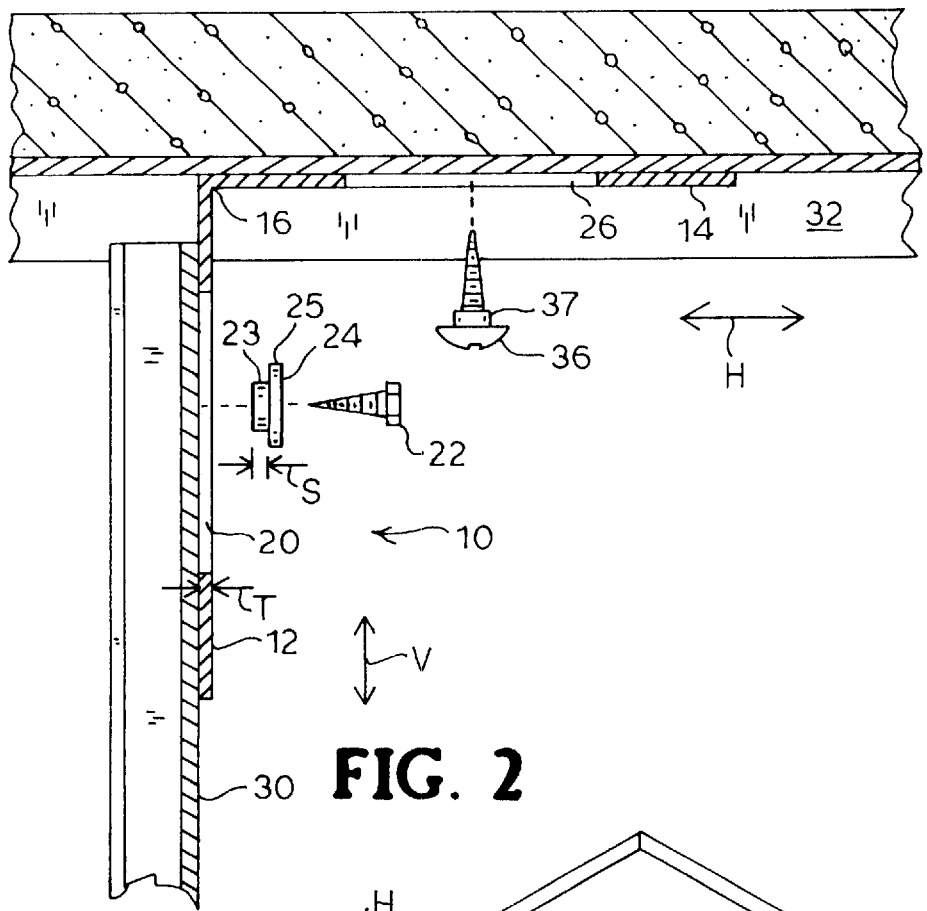
FIG. 2 is an enlarged cross sectional view through the connector of FIG. 1 taken in the direction of line 2—2 of FIG. 1 with fasteners shown in position prior to their installation.

Referring now to FIG. 2, a cross sectional view of connector 10 is illustrated as taken in the direction of line 2—2 of FIG. 1. This section is taken along a line through vertical slot 20 and horizontal slot 26 for clarity. Connector 10 is shown with its vertical plate 12 being in contact with vertical stud 30 and with its horizontal plate 14 in contact with horizontal track 32. As will be understood by those skilled in the art, in order for relative deflection to take place, fasteners securing connector 10 to building members 30 and 32 must not make binding contact with connector 10. In one such embodiment, screw 22 is passed through stepped washer 24 to firmly engage stud 30 as described above. Stepped washer 24 has shank 23 that is smaller in diameter than the width of slot 20 and greater in height S than the thickness T of connector 10. Flange 25 of stepped washer 24 is made of any convenient size that will not enter slot 20. When fastener 22, in this case a sheet metal screw, is inserted through stepped washer 24 and shank 23 thereof is positioned in slot 20, stud 30 is able to move vertically relative to connector 10 and track 32 in the direction of arrow V.

An alternate means of fastening connector 10 is illustrated in relation to track 32. Shoulder screw 36 essentially incorporates a sheet metal screw and a stepped washer in a single unit. Shoulder screw 36 has shoulder portion 37 that is sized and shaped similarly to shank 23 of stepped washer 24. When shoulder screw 36 is installed through slot 26, shoulder portion 37 resides slidingly within slot 26 so that track 32 can move horizontally relative to connector 10 and stud 30 in the direction of arrow H.

Installation of connector 10 with a separate screw 22 and stepped washer 24 or as a single unit shoulder screw 36 can be alternatively implemented employing a rivet, a straight threaded machine screw, or other fastening means, all being within the scope of the invention.

Figure 3:
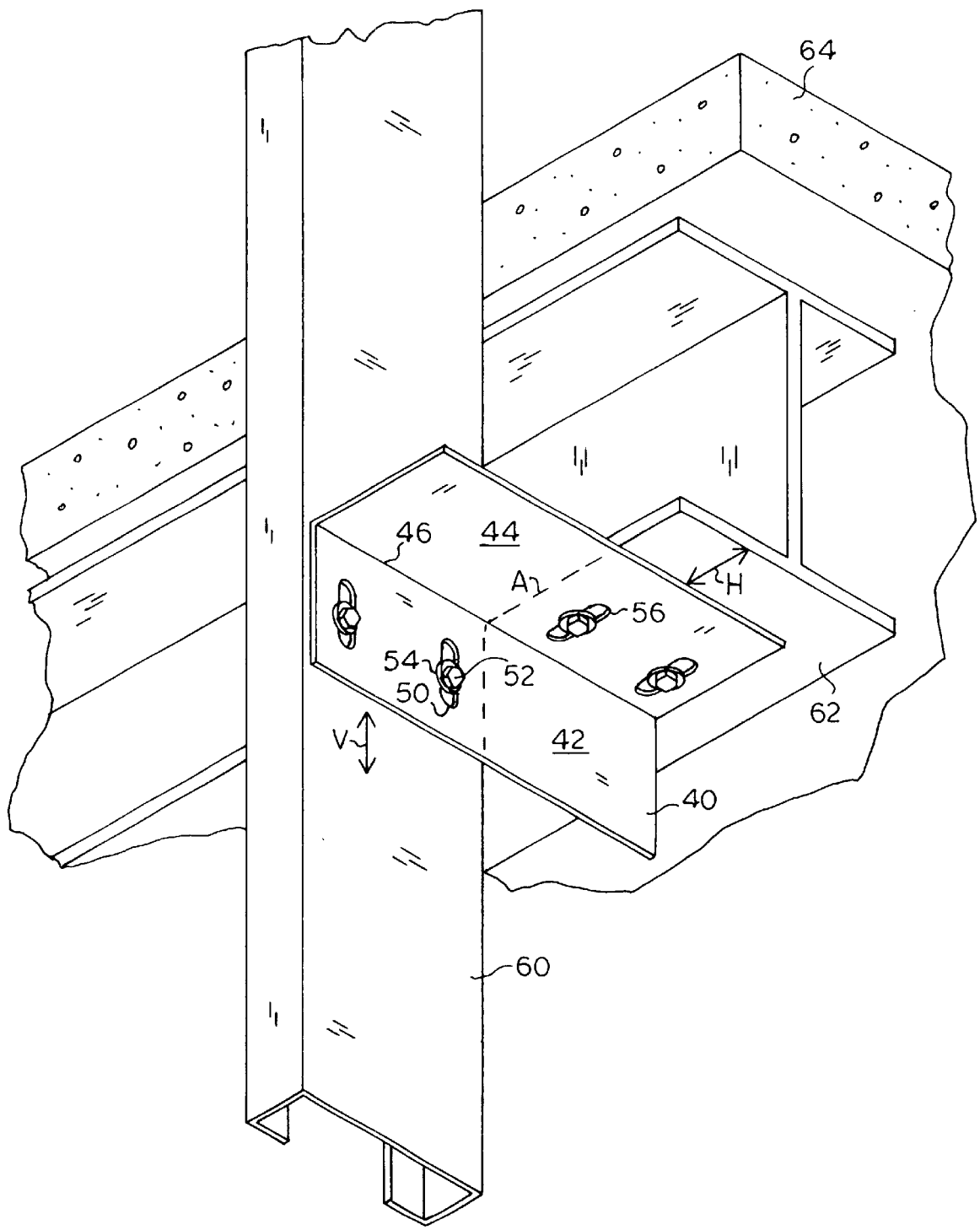
FIG. 3 is a perspective view of a second embodiment of the invention connector in which vertical mounting slots and horizontal mounting slots are offset from one another.

Referring now to FIG. 3, showing a further embodiment of the invention that pertains to situations in which the vertical and horizontal building members do not intersect. Connector 40 is attached to vertical member 60, such as a stud, and to horizontal member 62, such as a girder. Connector 40 comprises vertical plate 42 that connects to horizontal plate 44 at juncture 46. For purposes of explanation, a line A is shown as the approximate center of connector 40. Vertical slots 50, formed through vertical plate 42 are positioned on a first side of line A and horizontal slots 56 are positioned on a second side of line A. In this arrangement, slots 50 and slots 56 are each positioned adjacent a respective building members 60, 62. Fasteners 52 are installed through each slot 50, 56 of connector 40 with a stepped washer as described above. Alternatively, a shoulder fastener, also described above, may be used. Vertical member 60 is able to move vertically relative to horizontal member 62 in the direction of arrow V, and horizontal member 62 is able to move horizontally relative to vertical member 60 in the direction of arrow H.

Figure 4:
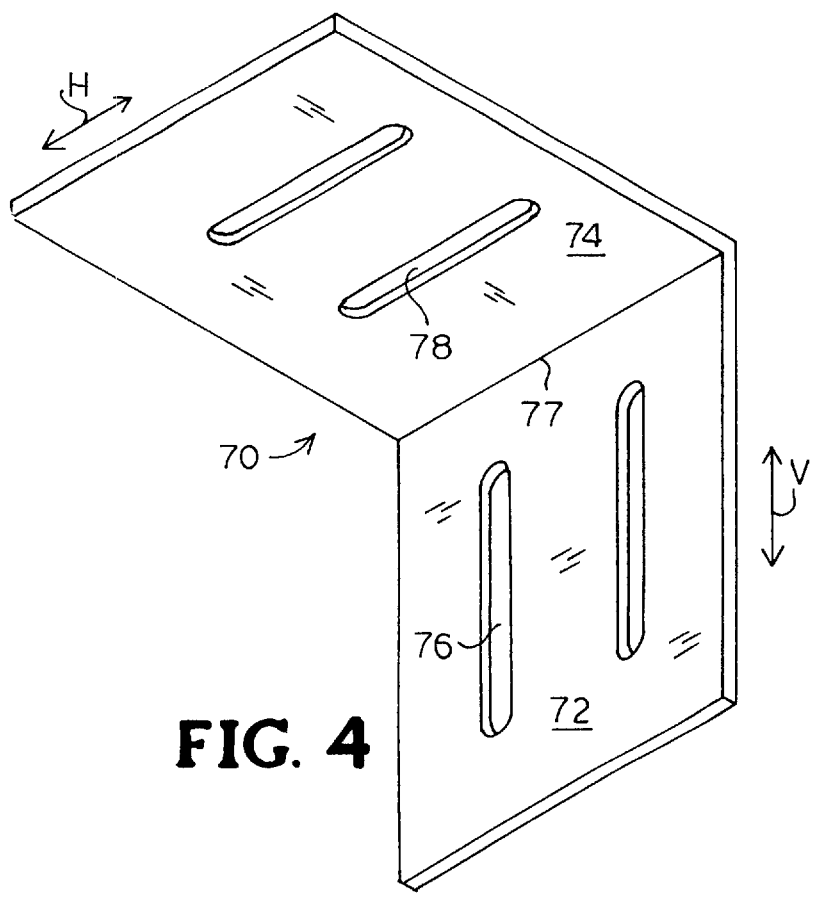
FIG. 4 is a perspective view of a third embodiment of the invention connector in which vertical mounting slots and horizontal mounting slots are differently oriented.
Figure 8:
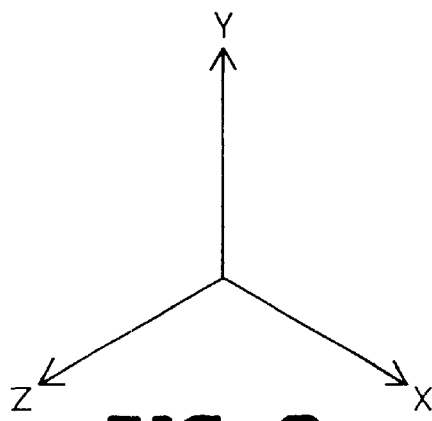
FIG. 8 is a schematic diagram illustrating three mutually orthogonal axes.

FIG. 4 depicts a further embodiment of the invention. Connector 70 comprises vertical plate 72, having vertical slots 76 and horizontal plate 74, having horizontal slots 78. Whereas both sets of slots of the embodiments shown in FIGS. 1–3 were oriented substantially perpendicular to the juncture between the vertical and horizontal plates of the respective connector, in the embodiment of FIG. 4, horizontal slots 78 are oriented parallel to junction 77. By this variation, the relative motion between attached vertical and horizontal building components, as described in terms of a conventional three-dimensional orthogonal coordinate system X–Y–Z (seen in FIG. 8), can be oriented in an X–Y relation in one case or in a Y–Z relation in another.

Figure 5:
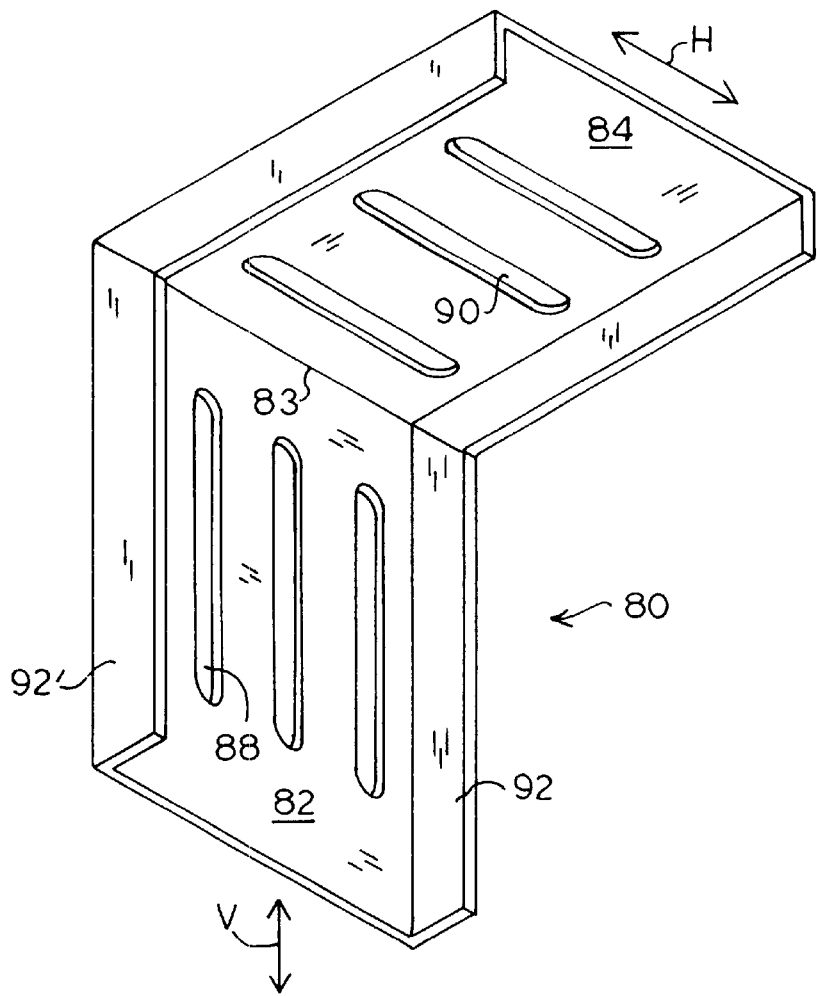
FIG. 5 is a perspective view of a fourth embodiment of the invention connector employing three parallel slots on each connector plate.

Referring now to FIG. 5, connector 80 provides additional modifications of the basic principle of the invention. Connector 80 has vertical plate 82 attached in perpendicular relation at juncture 83 to horizontal plate 84, and flanges 92 and 92' extending perpendicularly from the lateral edges of the respective plates 82 and 84. Vertical plate 82 is formed with, for example, three vertical slots 88 therethrough. Horizontal plate 84 is formed with, for example, three horizontal slots 90 that are oriented substantially parallel to juncture 83. As will be apparent to those skilled in the art, the decision of how many parallel slots are to be formed in each plate is somewhat arbitrary, as evidenced by the examples shown herein containing two slots in one case and three slots in another. Thus, the number of slots shown is an example of selected embodiments of the invention and not a limitation of its scope.

Figure 6:
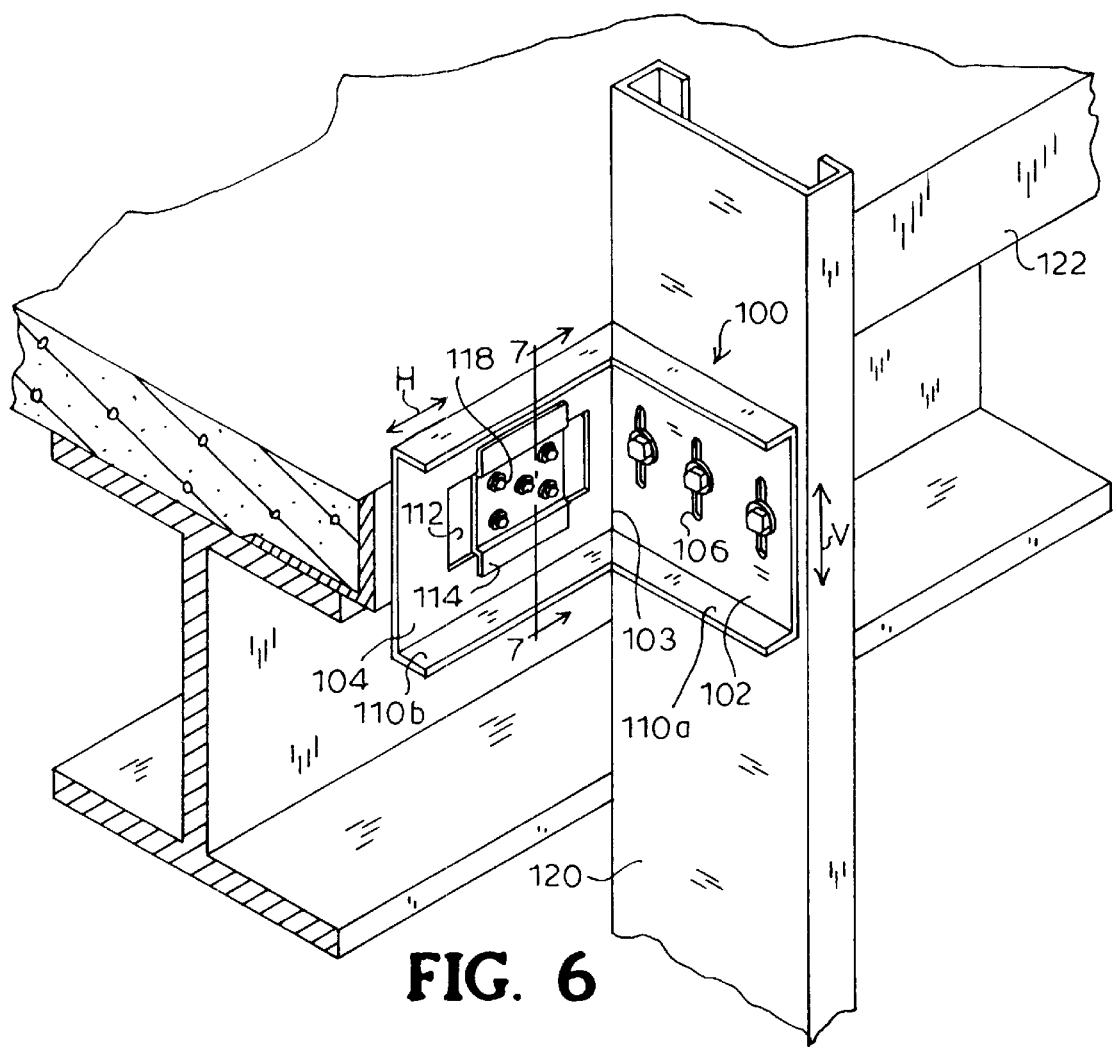
FIG. 6 is a perspective view of a fifth embodiment of the invention connector employing a rectangular stepped mounting plate on one connector plate and three slots on the other connector plate.
Figure 7:
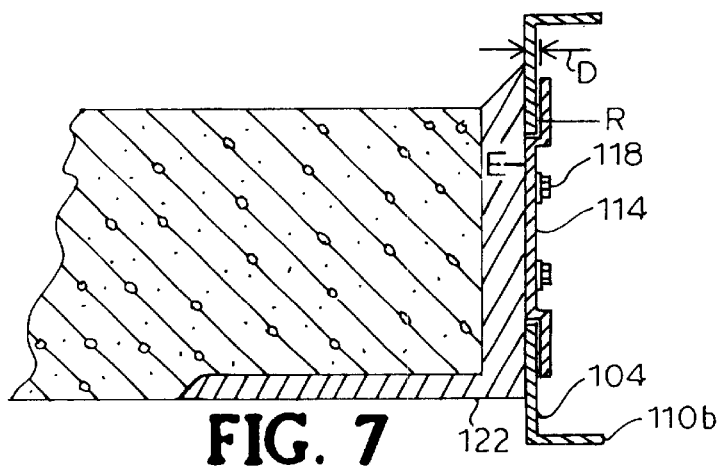
FIG. 7 is an enlarged cross sectional view through the connector of FIG. 6 taken in the direction of line 7—7 of FIG. 6.

A further embodiment of the invention is illustrated in FIGS. 6 and 7. FIG. 6 shows connector 100, having first vertical plate 102 attached perpendicularly at juncture 103 to second vertical plate 104. Connector 100 is adapted for installation in situations where vertical member 120, e.g., a stud, is being attached slideably to horizontal member 122, e.g., an angle beam, and the building members do not intersect. However, the connector shown in this embodiment could be utilized to slidably attach intersecting structural members as shown in FIG. 1. Vertical plate 102 is formed with three vertical slots 106 that are substantially parallel to juncture 103, each slot 106 having a fastener and stepped washer installed therethrough as described above. Vertical plate 104 is formed with an elongate slot in the form of a rectangular window 112. Window 112 is oriented with its long dimension horizontal. A guide 114, best seen in FIG. 7, is bent so as to have an engaging surface E adapted for engaging angle beam 122 and a retaining surface R parallel to and offset from engaging surface E, and adapted for containing vertical plate 104 in sliding engagement with angle beam 122. The offset distance D (see FIG. 7) between surfaces E and R of guide 114 is slightly greater than the thickness of the metal from which vertical plate 104 is made. FIG. 7 provides a cross section of guide 114 to show the required depth of offset between the engaging and retaining the two levels of guide 114. The engaging surface of guide 114 is slightly narrower than the opening of window 112 to permit sliding. Thus this further embodiment provides an additional manner of achieving vertical deflection of a first building structural member in the direction of arrow V and horizontal deflection of a second building structural member in the direction of arrow H (FIG. 6).

Figures 9, 10:
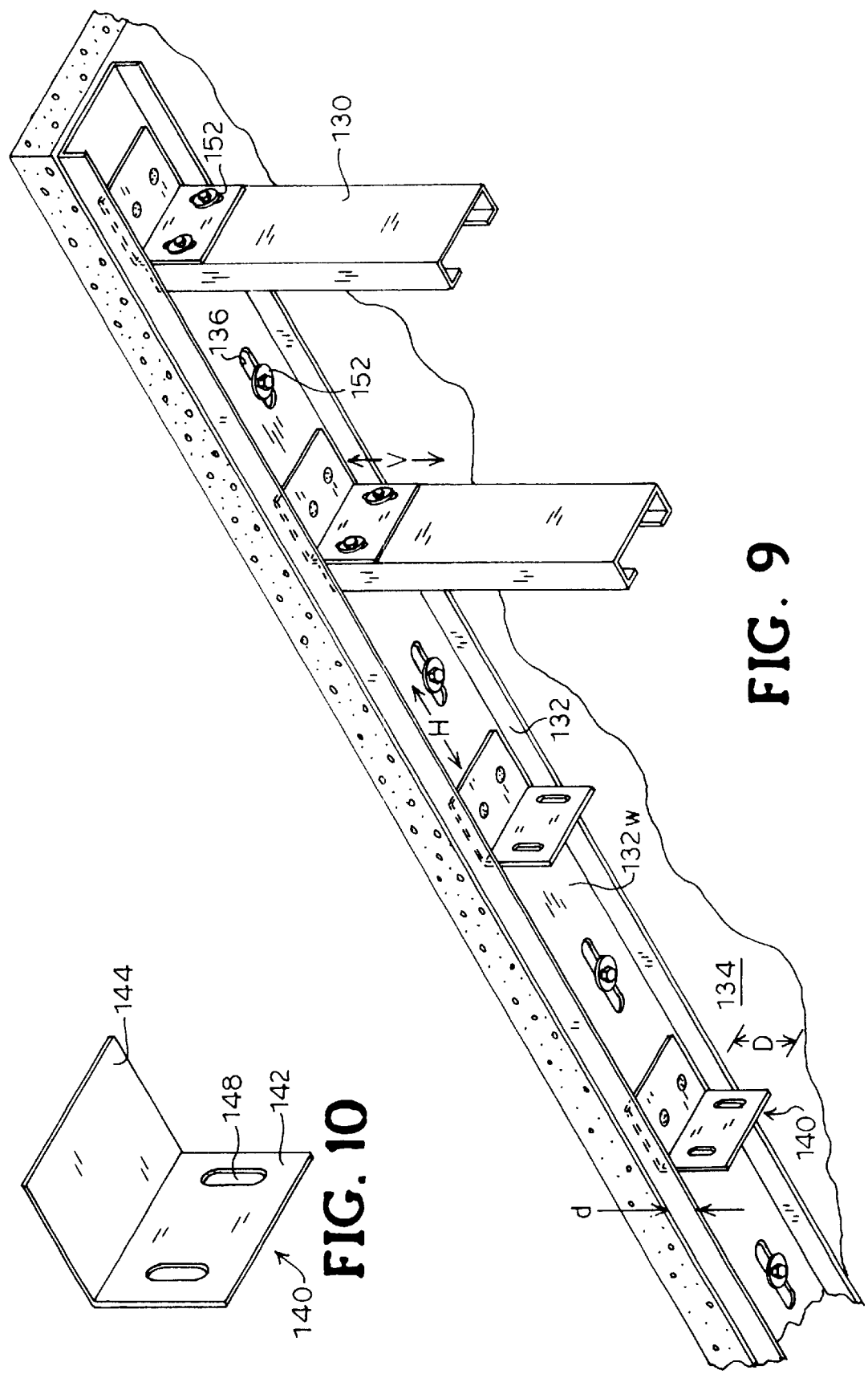
FIG. 9 is a perspective view of a second embodiment of the invention in which a plurality of unidirectional bracket assembled to a track that is free to move in a direction perpendicular thereto.
FIG. 10 is a perspective view of a unidirectional bracket of FIG. 10 prior to assembly thereto.

Referring now to FIG. 9, a second embodiment of the invention is illustrated. This second embodiment provides a track 132 to which a plurality of brackets 140 have been assembled for connecting a plurality of studs 130 to a ceiling member 134 or a floor member (not shown). Track 132 is formed in a generally elongate channel shape with a series of linear slots 136 punched through web 132w thereof at selected intervals along track 132. Typical intervals from the center of a first slot 136 to the center of an adjacent slot 136 is either 16 inches or 24 inches to accommodate the typical spacing of studs in a building wall. Slots 136 are oriented substantially parallel to the length of track 132.

The second component of the second embodiment of the invention is bracket 140, formed of bent metal to have vertical plate 142 and horizontal plate 144, seen prior to assembly to track 132 in FIG. 10. Vertical plate 142 is preferably formed with a pair of parallel, vertically oriented slots 148 therethrough. Horizontal plate 144 is preferably formed without holes. One unidirectional bracket 140 is fixedly mounted to web 132w intermediate each pair of adjacent slots 136, for example by spot welding, so as to be similarly spaced apart from the next bracket 140. By welding brackets 140 to track 132, as opposed to assembly with screws or rivets, no fastener part protrudes above track 132.

With a plurality of brackets 140 welded or otherwise affixed to the inside of web 132w and a plurality of slots 136 formed through web 132w intermediate brackets 140, track 132 is slidingly assembled to ceiling member 134 by means of a fastener 152 passed through each slot 136. Fastener 152 preferably comprises a sheet metal screw with a spacer, as discussed in detail above. Track 132 will be moveable in the direction indicated by arrow H, but no other direction. With track 132 thus mounted, a series of vertically oriented studs 130 are slidingly assembled to bracket 140 by passing a similar fastener 152 through slots 148 in vertical plate 142. Studs 130 are preferably formed shorter by approximately the height d of track 132 as compared to the distance between ceiling track 132 and a floor track (not shown) to allow a degree of vertical freedom in case of seismic activity. Ceiling track 132 is slidingly mounted to ceiling member 134 to allow horizontal freedom.

The above detailed description of a preferred embodiment of the invention sets forth the best mode contemplated by the inventor for carrying out the invention at the time of filing this application and is provided by way of example and not as a limitation. Accordingly, various modifications and variations obvious to a person of ordinary skill in the art to which it pertains are deemed to lie within the scope and spirit of the invention as set forth in the following claims.

What is claimed is:

1. A connector for connecting first and second building members in a manner to permit bi-directional relative movement between the first and second building members and the connector, the connector, comprising:
    (a) a planar sheet having a thickness and being bent to form a first plate in perpendicular relation to a second plate with a juncture therebetween;
    (b) said first plate being formed with at least one elongate slot therethrough, said at least one slot being perpendicular to said juncture;
    (c) said second plate being formed with at least one elongate slot therethrough, said at least one slot being perpendicular to said juncture;
    (d) means for fixedly connecting said first plate to the first building member such that said first plate is slideable relative to the first building member in a direction substantially parallel to a length of said at least one slot in said first plate;
    (e) means for fixedly connecting said second plate to the second building member such that said second plate is slideable relative to the second building member in a direction substantially parallel to a length of said at least one slot in said second plate; and
    (f) wherein the connector acts to connect the first and second building members together but permits relative movement between the connector and each of the first and second building members as said first plate may move with respect to the first building member while said second plate remains attached to the second building member and wherein said second plate may move with respect to the second building member while the first plate is attached to the first building member.

2. The connector as described in claim 1, wherein said means for fixedly connecting said first plate to a first building member comprises a fastener passed through a stepped washer, said stepped washer having a shank with a diameter slightly less than a width of said elongate slot the thickness slightly greater than the thickness of said first plate.

3. The connector as described in claim 1, wherein said means for fixedly connecting said first plate to a first building member comprises a plurality of fasteners passed through a guide sized for slidingly engaging said slot and said guide having a first surface adapted for being fixedly engaged on said building component and a second surface parallel to and offset from said first surface wherein the distance of offset is slightly greater than the thickness of said first plate.

4. The connector as described in claim 1, wherein said means for fixedly connecting said first plate and said second plate to a respective first and second building member comprises a shoulder fastener.

5. The connector as described in claim 1, wherein said at least one slot formed through said first plate is located at a first end of said connector and said at least one slot formed through said second plate is located at a second end of said connector such that said first plate slot and said second plate slot are offset from one another.

6. A building system, comprising:
    (a) a plurality of vertical structural members;
    (b) a plurality of horizontal structural members;
    (c) a plurality of connectors for connecting said vertical and horizontal members, said connectors comprising:
        (i) a planar sheet having a thickness and being bent to form a first plate in perpendicular relation to a second plate with a juncture therebetween;
        (ii) said first plate being formed with at least one elongate slot therethrough, said at least one slot being perpendicular to said juncture;
        (iii) said second plate being formed with at least one elongate slot therethrough, said at least one slot being perpendicular to said juncture;
        (iv) means for fixedly connecting said first plate to a first building member such that said first plate is slideable in a direction substantially parallel to a length of said at least one slot in said first plate;
        (v) means for fixedly connecting said second plate to a second building member being substantially perpendicular to said first building member and such that said second plate is slideable in a direction substantially parallel to a length of said at least one slot in said second plate; and
        (vi) wherein said first plate is movable with respect to the first building member while the second plate is connected to the second building member, and wherein the second plate is movable with respect to the second building member while the first plate is secured to the first building member, thereby providing bidirectional movement between the first and second building members and the first and second plates.

7. The connector as described in claim 6, wherein said means for fixedly connecting said first plate to a first building member comprises a fastener passed through a stepped washer, said stepped washer having a shank with a diameter slightly less than a width of said elongate slot the thickness slightly greater than the thickness of said first plate.

8. The connector as described in claim 6, wherein said means for fixedly connecting said first plate to a first building member comprises a plurality of fasteners passed through a guide sized for slidingly engaging said slot and said guide having a first surface adapted for being fixedly engaged on said building component and a second surface parallel to and offset from said first surface wherein the distance of offset is slightly greater than the thickness of said first plate.

9. The connector as described in claim 6, wherein said means for fixedly connecting said first plate and said second plate to a respective first and second building member comprises a shoulder fastener.

10. The connector as described in claim 6, wherein said at least one slot formed through said first plate is located at a first end of said connector and said at least one slot formed through said second plate is located at a second end of said connector such that said first plate slot and said second plate slot are offset from one another.

11. A connector for connecting building components in a manner to permit bi-directional relative movement therebetween, comprising:

(a) an elongate channel member having a pair of substantially parallel sides connected by a web having a first thickness;

(b) a plurality of longitudinally spaced slots formed through the web and oriented in a direction substantially parallel to the length of the elongate channel member, the slots having a first width;

(c) a plurality of brackets assembled to and depending from the web and residing between the sides of the channel member;

(d) each of the plurality of brackets having a planar portion having a second thickness and oriented perpendicular to the web and perpendicular to the sides;

(e) each planar portion being formed with at least one slot having a second width formed therethrough and oriented in a direction substantially perpendicular to the web;

(f) whereas each slot through the web is adapted for mounting the channel member to a first building structural member so as to permit linear sliding motion therebetween and each slot through the bracket planar portion is adapted for mounting a second building structural member to the planar portion so as to permit sliding linear motion therebetween; and (g) wherein the elongated channel member may move with respect to the first building member while the bracket is attached to the second building member, and wherein the bracket may move with respect to the second building member while the elongated channel member is attached to the first building member.

12. The connector as described in claim 11, further comprising a plurality of fasteners passed through an equal plurality of spacers having a shank with a diameter slightly less than the width of the respective slots and having a length slightly greater than the first or second thickness.

13. A connecter for connecting first and second building members in a manner that permits bi-directional relative movement between the first and second building members and the connector, the connector comprising:

a. a planar sheet having a thickness and bent to form a first plate, a second plate, a juncture between the two plates and wherein the first and second plates are disposed in perpendicular relationship to each other;

b. the first plate having at least one elongated slot formed therein;

c. the second plate having at least one elongated slot formed therein;

d. means for fixedly connecting said first plate to the first building member such that the first plate is slideable relative to the first building member in a direction substantially parallel to the length of the slot formed in the first plate;

e. means for fixedly connecting said second plate to the second building member such that the second plate is slideable relative to the second building member in a direction substantially parallel to the length of the slot formed in the second plate;

f. wherein the connector acts to connect the first and second building members together but permits relative movement between the connector and each of the first and second building members;

g. a pair of flanges formed on opposed edges of each of said first and second plates, the flanges associated with each plate extending in general parallel relationship; and h. wherein the first plate is movable with respect to the first building member while the second plate is attached to the second building member, and wherein the second plate is movable with respect to the second building member while the first plate is secured to the first building member.

\* \* \* \* \*